United States Patent [19]

Pepich

[11] Patent Number: 5,839,223
[45] Date of Patent: Nov. 24, 1998

[54] VARIABLE SIZED HOUSING FOR PROTECTING PLANTS BY UTILIZING WATER AS A HEAT SINK

[76] Inventor: Paul S. Pepich, 8155 South New Castle Ave., Burbank, Ill. 60459-1674

[21] Appl. No.: 746,169

[22] Filed: Nov. 7, 1996

[51] Int. Cl.[6] .......................... A01G 13/00; A01G 31/02; A01G 9/00
[52] U.S. Cl. ........................................ 47/26; 47/65; 47/17
[58] Field of Search .................................. 403/205, 381, 403/331, 217; 160/135; 47/30, 17, 32, 21, 86, 65, 66, 69, 26, 29

[56] References Cited

U.S. PATENT DOCUMENTS 3,206,892 9/1965 Telkes et al. ................................ 47/30
5,499,886 3/1996 Short et al. ............................... 403/381
5,509,229 4/1996 Thomasson et al. ....................... 47/30

FOREIGN PATENT DOCUMENTS 1436780 5/1976 United Kingdom ................... 403/331

*Primary Examiner*—Michael J. Carone
*Assistant Examiner*—Fredrick T. French, III

[57] ABSTRACT

A variable sized housing for protecting plants by utilizing water as a heat sink comprising a plurality of panels with coupling means for allowing the panels to construct a housing for surrounding a plant. Each panel has a hollow interior for allowing the storage of liquid therein thus providing insulation.

2 Claims, 4 Drawing Sheets

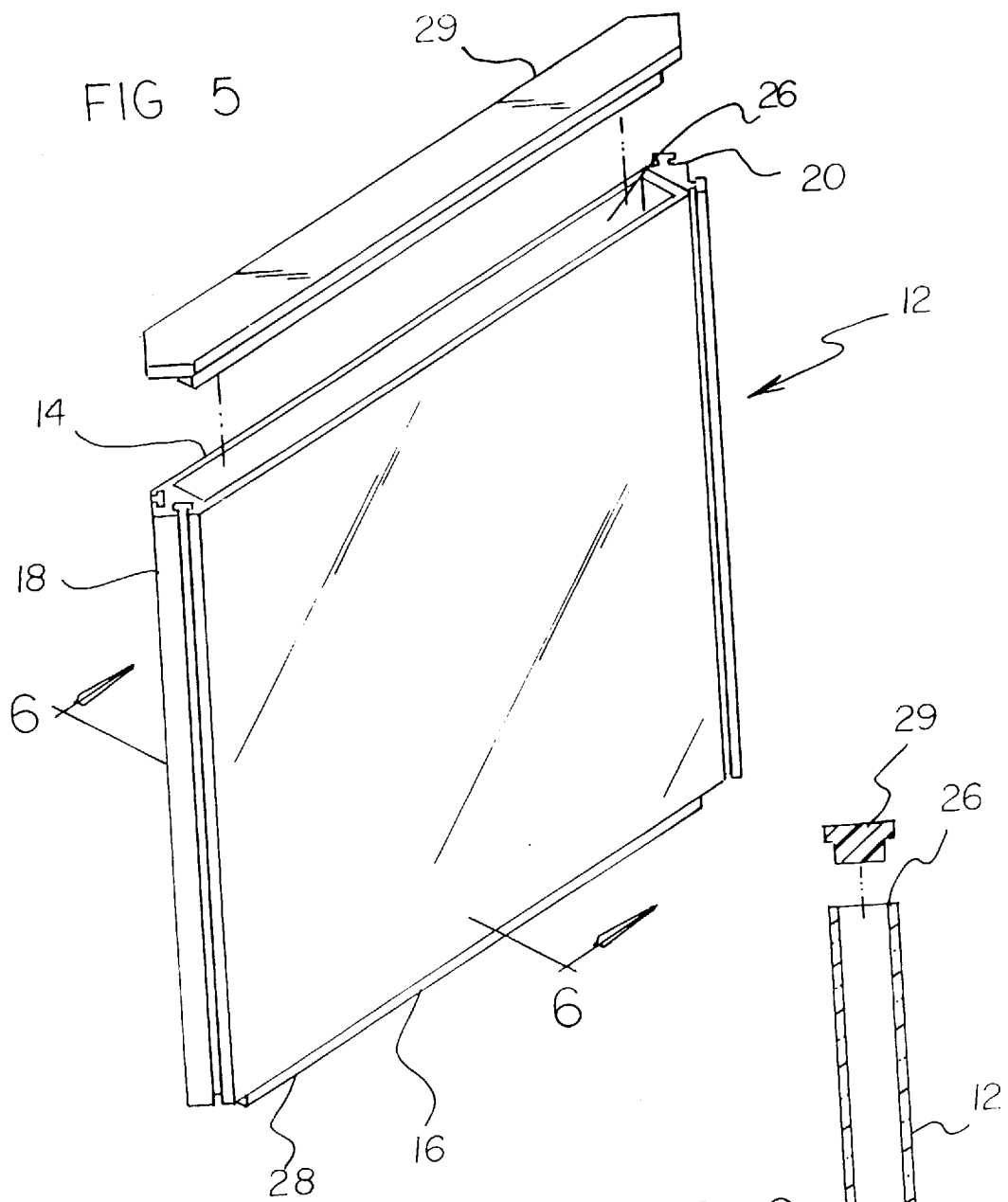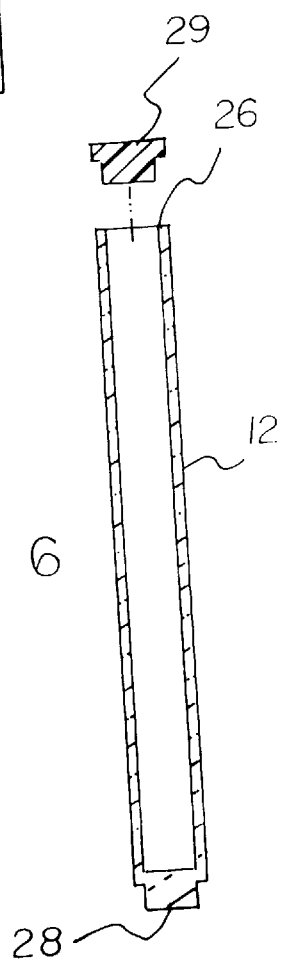

VARIABLE SIZED HOUSING FOR PROTECTING PLANTS BY UTILIZING WATER AS A HEAT SINK

BACKGROUND OF THE INVENTION

1. Field of the Invention

The present invention relates to a variable sized housing for protecting plants by utilizing water as a heat sink and more particularly pertains to constructing transparent housings of various sizes from panels which may be filled with water.

2. Description of the Prior Art

The use of green houses is known in the prior art. More specifically, green houses heretofore devised and utilized for the purpose of protecting plants from adverse weather conditions are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. No. 4,622,950 to Greenbaum; U.S. Pat. No. 5,056,259 to Allen; U.S. Pat. No. 5,224,306 to Cramer; and U.S. Pat. No. 5,224,306 to Cramer.

In this respect, the variable sized housing for protecting plants by utilizing water as a heat sink according to the present invention substantially departs from the conventional concepts and designs of the prior art, and in so doing provides an apparatus primarily developed for the purpose of constructing transparent housings of various sizes from panels which may be filled with water.

Therefore, it can be appreciated that there exists a continuing need for a new and improved variable sized housing for protecting plants by utilizing water as a heat sink which can be used for constructing transparent housings of various sizes from panels which may be filled with water. In this regard, the present invention substantially fulfills this need.

SUMMARY OF THE INVENTION

In view of the foregoing disadvantages inherent in the known types of green houses now present in the prior art, the present invention provides an improved variable sized housing for protecting plants by utilizing water as a heat sink. As such, the general purpose of the present invention, which will be described subsequently in greater detail, is to provide a new and improved variable sized housing for protecting plants by utilizing water as a heat sink which has all the advantages of the prior art and none of the disadvantages.

To attain this, the present invention essentially comprises a plurality of panels each with a rectilinear configuration. Each panel has a top face, a bottom face, a first side face, and a second side face defining a periphery and an interior space. The first side face of each panel has a triangular cross-section with a first surface integrally formed thereon. Such triangular cross-section further has a second surface and a third surface both having a T-shaped cut out formed along the length thereof. The second side face of each panel has a triangular cross-section with a first surface integrally formed thereon similar to the first side face. Such triangular cross-section of the second side face has a second surface and a third surface both having a T-shaped protrusion formed along the length thereof. The top face of each panel has at least one slot formed along the length Thereof for allowing the insertion of water within the interior space thereof. As shown in the Figures, the bottom face of each panel has a protrusion having a rectangular cross-section formed along the length thereof with a size corresponding to that of the slot of the top face of each panel. By this structure, the protrusion of the bottom face of one panel may be releasably inserted within the slot of the top face of another panel thus forming a wall with a doubled height when stacked vertically. Also, the T-shaped protrusions of one panel are adapted to releasably couple with the T-shaped slots of another panel thus creating a right angle with respect to each other. Further provided is a top with a pyramid configuration having four bevelled side faces forming a square bottom with four side edges. Each of the four side edges have a length corresponding to that of the panels.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved variable sized housing for protecting plants by utilizing water as a heat sink which has all the advantages of the prior art green houses and none of the disadvantages.

It is another object of the present invention to provide a new and improved variable sized housing for protecting plants by utilizing water as a heat sink which may be easily and efficiently manufactured and marketed.

It is a further object of the present invention to provide a new and improved variable sized housing for protecting plants by utilizing water as a heat sink which is of a durable and reliable construction.

An even further object of the present invention is to provide a new and improved variable sized housing for protecting plants by utilizing water as a heat sink which is susceptible of a low cost of manufacture with regard to both materials and labor, and which accordingly is then susceptible of low prices of sale to the consuming public, thereby making such variable sized housing for protecting plants by utilizing water as a heat sink economically available to the buying public.

Still yet another object of the present invention is to provide a new and improved variable sized housing for protecting plants by utilizing water as a heat sink which provides in the apparatuses and methods of the prior art some of the advantages thereof, while simultaneously overcoming some of the disadvantages normally associated therewith.

Still another object of the present invention is to construct transparent housings of various sizes from panels which may be filled with water.

Lastly, it is an object of the present invention to provide a new and improved variable sized housing for protecting plants by utilizing water as a heat sink comprising a plurality of panels with coupling means for allowing the panels to construct a housing for surrounding a plant. Each panel has a hollow interior for allowing the storage of liquid therein thus providing insulation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a perspective view of one of the panels of the present invention.

FIG. 6 is a cross-sectional view of the panel shown in FIG. 5.

Similar reference characters refer to similar parts throughout the several views of the drawings.

DESCRIPTION OF THE PREFERRED EMBODIMENT

Figure 1:
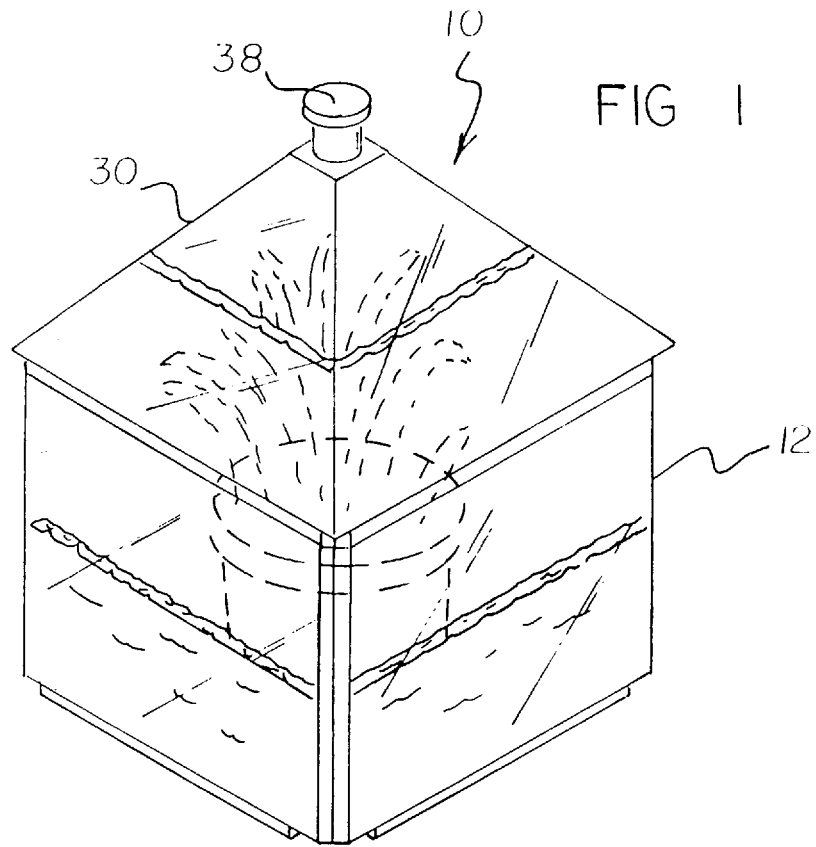
FIG. 1 is a perspective illustration of the preferred embodiment of the variable sized housing for protecting plants by utilizing water as a heat sink constructed in accordance with the principles of the present invention.
Figure 2:
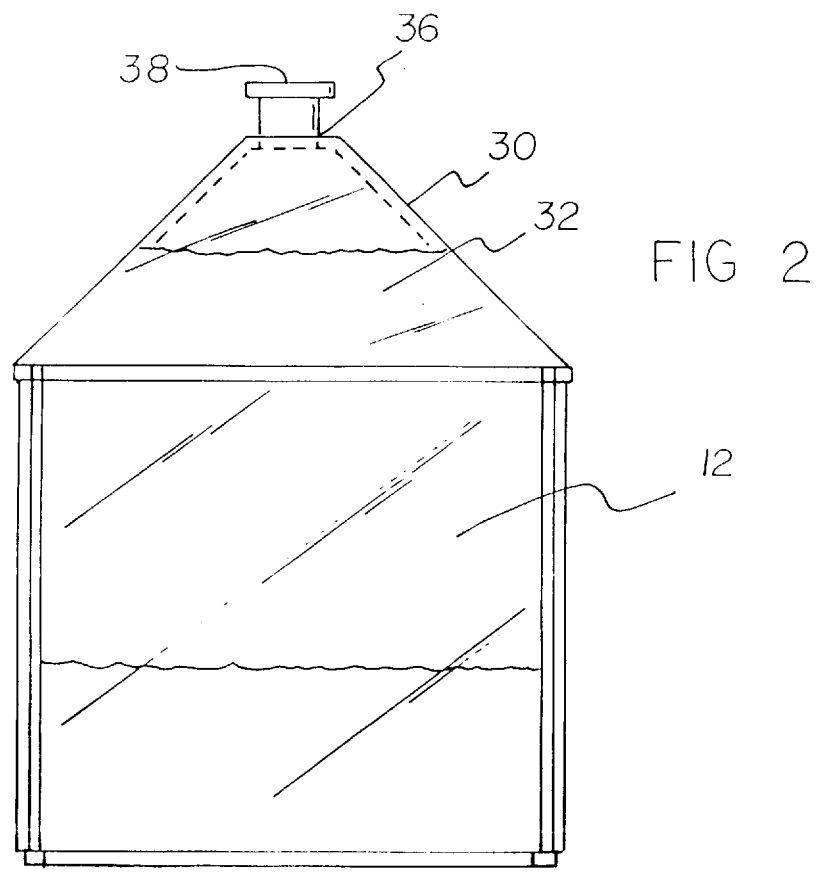
FIG. 2 is a side elevational view of the present invention.
Figure 3:
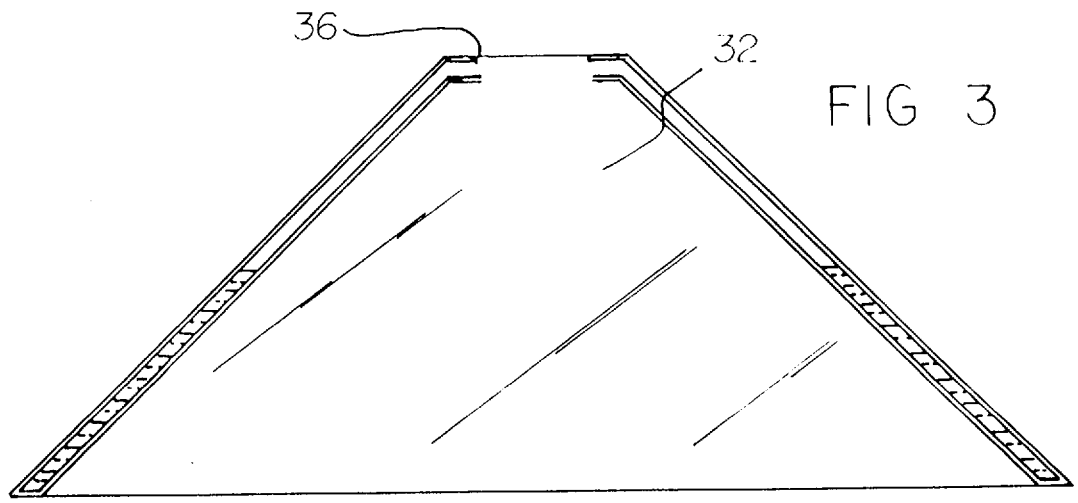
FIG. 3 is a cross-sectional view of the top of the present invention shown in FIG. 2.
Figure 4:
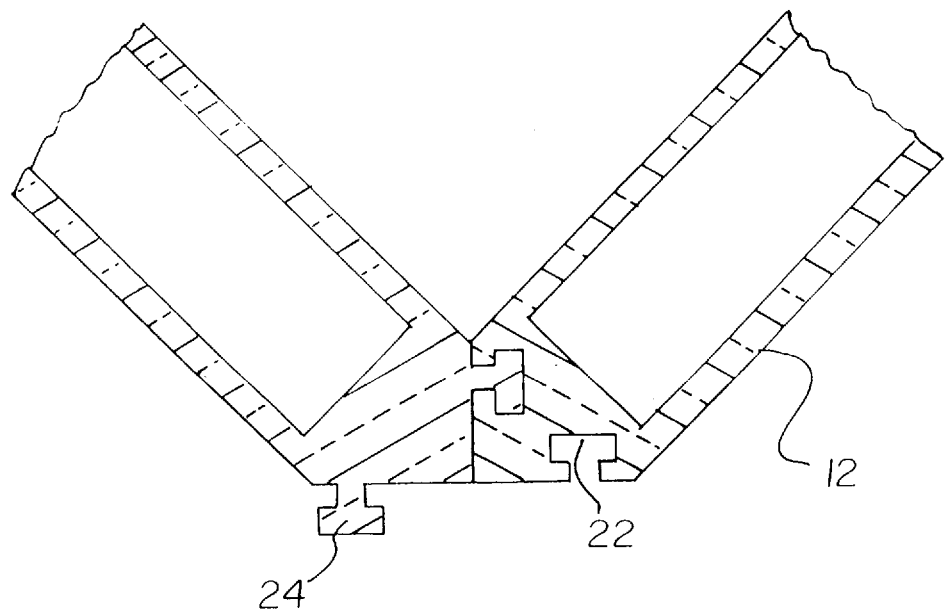
FIG. 4 is a cross-sectional view of the coupling of a pair of panels of the present invention.
Figure 7:
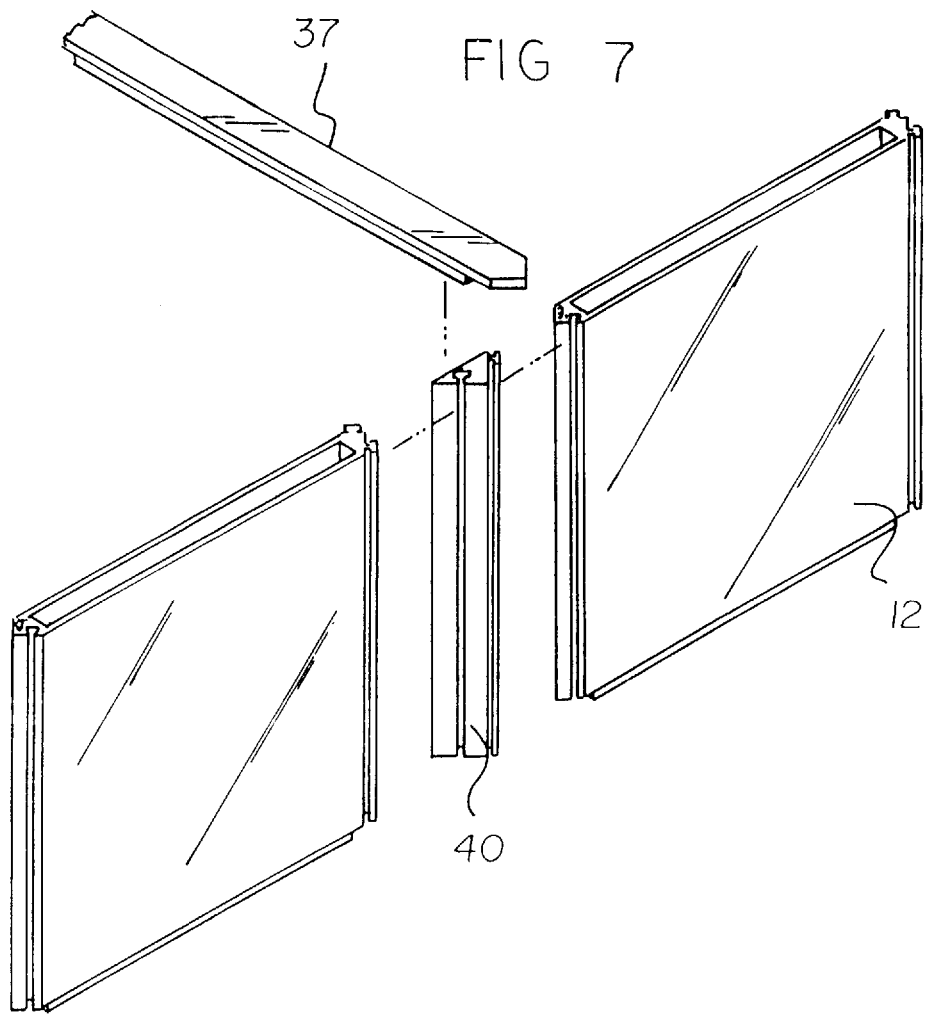
FIG. 7 is an exploded view of various components of the present invention.
Figure 8:
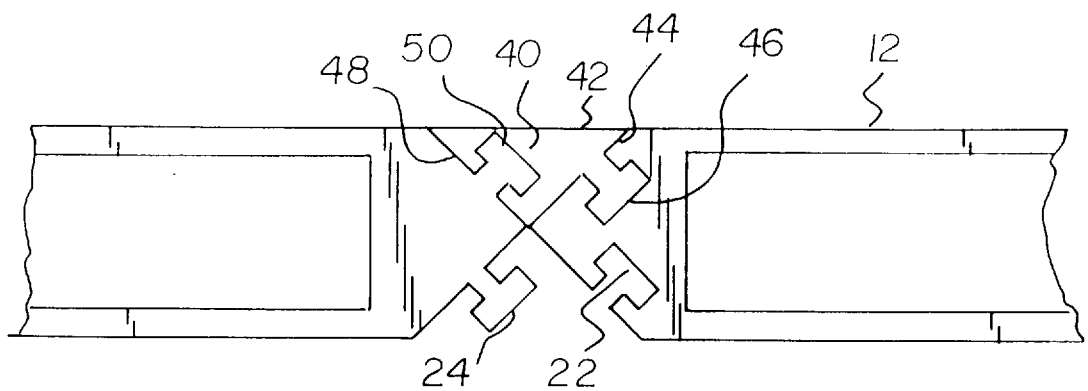
FIG. 8 is a top plan view of the employment of the elongated panel couple of the present invention.

With reference now to the drawings, and in particular to FIG. 1 thereof, a new and improved variable sized housing for protecting plants by utilizing water as a heat sink embodying the principles and concepts of the present invention and generally designated by the reference numeral 10 will be described.

The present invention, the new and improved variable sized housing for protecting plants by utilizing water as a heat sink, is comprised of a plurality of components. Such components in their broadest context include a plurality of panels, a top, and a plurality of couples. Such components are individually configured and correlated with respect to each other so as to attain the desired objective.

More specifically, it will be noted that the system 10 of the present invention includes a plurality of panels 12 each with a rectilinear configuration. Preferably, the panels are constructed from a rigid transparent material such as PLEXIGLASS ™ with a thickness of approximately ¼ of an inch. Each panel has a top face 14, a bottom face 16, a first side face 18, and a second side face 20 defining a periphery and an interior space. The panels ideally have a height of approximately 12 inches, a width of approximately 12 inches, and a thickness of approximately 2 inches. The first side face of each panel has a triangular cross-section with a first surface integrally formed thereon. Such triangular cross-section further has a second surface and a third surface both having a T-shaped cut out 22 formed along the length thereof. The second side face of each panel has a triangular cross-section with a first surface integrally formed thereon similar to the first side face. Such cross-section of the second side face has a second surface and a third surface both having a T-shaped protrusion 24 formed along the length thereof.

With reference to FIGS. 5 & 6, the top face of each panel has at least one slot 26 formed along the length thereof for allowing the insertion of water within the interior space thereof. As shown in the Figures, the bottom face of each panel has a protrusion 28 having a rectangular cross-section formed along the length thereof with a size corresponding to that of the slot of the top face of each panel. By this structure, the protrusion of the bottom face of one panel may be releasably inserted within the slot of the top face of another panel thus forming a wall with a doubled height when stacked vertically. Also, the T-shaped protrusions of one panel are adapted to releasably couple with the T-shaped slots of another panel thus creating a right angle with respect to each other.

In addition, a plurality of elongated rectangular stoppers 29 are included with a protrusion having a rectangular cross-section formed along the length thereof. For allowing each stopper to be releasably coupled to the top face of the panels, the protrusion has a size corresponding to that of the slot of the top face of each panel. Also, ends of each stopper has a triangular extension formed thereon with a size and shape corresponding to that of the first and second side face of each of the panels.

By this structure, the panels are capable of constructing a housing in the form of a miniature green house. Along the botton of each panel would be a series of vertical lines that would serve as planting guides. ¼" marks would be indicated at 1½", 4½", 7½", and 10½" along the bottom. ½" marks would be placed at 2", 6", and 10" along the bottom, and ¾" marks would be placed at 3" and 9" along the bottom.

Further provided is a top 30 with a pyramid configuration having four bevelled side faces 32 forming a square bottom with four side edges. Each of the four side edges have a length approximately that of the panels. The top further includes an aperture 36 with a 1 inch diameter for use as a vent formed at an apex thereof. It should be noted that the top has an interior space similar to that of the panels for allowing water to be stored therein.

As an option, support rods 37 may be situated on a top open face of a housing constructed from the panels which exceeds the length of the top. As such, a plurality of tops may be situated on the enlarged housing for providing protection for the enclosed plants. In the preferred embodiment such support rods should be available in lengths of 23, 35, and 47 inches. In an alternate embodiment, a tarp may be situated about the open top of the housing using clips for clamping to the top faces of the panels.

For further sealing the top, an elastomeric cylindrical stopper 38 is included. The cylindrical stopper is adapted to be inserted within the aperture of the top with a horizontally oriented lip for allowing convenient selective removal thereof.

To allow the panels to be releasably coupled within a single plane, an elongated panel couple 40 is included having a triangular cross-section. The couple has a first planar surface 42, a second surface 44 having a T-shaped protrusion 46 formed along the length thereof for coupling with one panel, and a third surface 48 having a T-shaped cut out 50 formed along the length thereof for coupling with another panel.

In yet another alternate embodiment, a hinged square with closures fashioned from wingnuts could be added in place of a standard panel to allow a user access through the side of a stack of panels for harvesting tall plants such as tomatoes.

In use, the panels may be coupled with various heights and lengths for forming walls which may surround various plants and provide insulation therefor. The user may place a constructed housing over a desired plant in an outside environment then fill each panel with water. The water acts as a heat sink for the plant, absorbing the heat energy of the sun during the day and releasing it at night. To further add to the "greenhouse" effect, the user may use the cylindrical stopper to protect the plant during cold evenings or remove it to preclude over heating during the daytime.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A variable sized housing for protecting plants comprising, in combination:

a plurality of panels each with a rectilinear configuration having a top face, a bottom face, a first side face, and a second side face defining a periphery and an interior space, the first side face of each panel having a triangular cross-section with a first surface integrally formed thereon and a second surface and a third surface both having a T-shaped cut out formed along the length thereof, the second side face of each panel having a triangular cross-section with a first surface integrally formed thereon and a second surface and a third surface both having a T-shaped protrusion formed along the length thereof, the top face of each panel having at least one slot formed along the length thereof for allowing the insertion of water within the interior space of each panel, the bottom face of each panel with a protrusion having a rectangular cross-section formed along the length thereof with a size corresponding to that of the slot of the top face of each panel, whereby the T-shaped protrusions of one panel is adapted to releasably couple with the T-shaped slots of another panel thus creating a right angle with respect to each other and the protrusion of the bottom face of one panel may be releasably inserted within one of the slots of the top face of another panel thus forming a wall with a doubled height when stacked vertically;

a top with a pyramid configuration having four bevelled side faces forming a square bottom with four side edges each having a length corresponding to that of the panels, the top further including an aperture formed at an apex thereof;

a cylindrical stopper adapted to be inserted within the aperture of the top with a horizontally oriented lip for allowing the convenient selective removal thereof; and an elongated panel couple for allowing the panels to be releasably coupled within a single plane, the panel couple having a triangular cross-section including a first planar surface, a second surface having a T-shaped protrusion formed along the length thereof for coupling with one panel, and a third surface having a T-shaped cut out formed along the length thereof for coupling with another panel;

whereby the panels may be coupled with various heights and lengths for forming walls which may surround one of a plurality of various plants and provide insulation therefor.

2. A variable sized housing for protecting plants comprising a plurality of panels each with a rectilinear configuration having a top face, a bottom face, a first side face, and a second side face, the first side face of each panel having a triangular cross-section with a first surface integrally formed thereon and a second surface and a third surface both having a T-shaped cut out formed along the length thereof, the second side face of each panel having a triangular cross-section with a first surface integrally formed thereon and a second surface and a third surface both having a T-shaped protrusion formed along the length thereof, the top face of each panel having a slot formed along the length thereof, the bottom face of each panel with a protrusion having a rectangular cross-section formed along the length thereof with a size corresponding to that of the slot of the top face of each panel, whereby the T-shaped protrusions of one panel is adapted to releasably couple with the T-shaped slots of another panel thus creating a right angle with respect to each other and the protrusion of the bottom surface of one panel may be releasably inserted within the slot of the top surface of another panel thus forming a wall with a doubled height when stacked vertically; whereby the panels may be coupled with various heights and lengths for forming walls which may surround various plants and provide insulation therefor.

\* \* \* \* \*